Patented July 28, 1936

2,049,110

UNITED STATES PATENT OFFICE 2,049,110

REACTIVE PENCIL FOR THE DETERMINATION OF THE pH INDEX

Raymond Antonin Albert Dru, St.-Gratien, France

No Drawing. Application March 1, 1934, Serial No. 713,611. In France March 7, 1933

2 Claims. (Cl. 23—253)

The determination of the pH index is actually effected according to two methods:
 1. Electrometric methods,
 2. Colorimetric methods.

The first methods, reserved for laboratory work of great precision, necessitate costly and delicate apparatus, the manipulation of which is relatively complicated and requires a certain amount of experience.

Although less accurate, but more simple in their application, colorimetric methods are commonly used in the daily practice of chemistry manipulations, as well as industrially in the laboratory. On the other hand, even approximate colorimetric determination often avoids the use of electrometric methods. In all cases where the colorimetric method is used, an organic colouring matter is put in contact with the liquid to be examined, this organic colouring matter indicating in variations of colour the pH variations of the solutions and is accordingly called coloured indicator.

A few drops of the solution of the suitably chosen colouring matter are added to the liquid, the pH value of which is to be determined. The tint observed indicates the approximate pH value by referring to the range of coloured tonings of the indicator used.

The observation is effected by transparency in glass of the Nessler type, in test tubes of variable capacity, even in capillary tubes, in watch glasses, etc. A modification of the method consists in introducing the colouring matter no longer in the liquid form, in solution, but previously deposited upon a small gelatin or celluloid plate. The toning of the tint caused by the reaction of the medium is observed on said plate.

The use of coloured comparison scales, constituted by standard solutions of known pH values, maintained in sealed tubes or being freshly prepared according to requirements, or the use of series of previously coloured plates in the same solutions, increases considerably the accuracy of these methods permitting the intermediate tints to be accurately distinguished.

In any case, the manipulations necessitated by each of these methods, although much simpler than those of electrometric methods, must however be effected with great care, as the instruments such as capillary glass tubes or the like, colored scales, etc., used in these manipulations are fragile and require careful handling. Moreover, chemists familiar with colorimetric methods know to what extent comparison scales are instable, owing, on the one hand, to the instability of certain colouring matters and, on the other hand, owing to the difficulty met with in finding neutral glass which does not give off alkali to the solutions they contain.

The natural coloration of the liquids to be tested moreover prevents colorimetric determination. It is then necessary to use so-called compensating cells, the utilization of which complicates the modus operandi.

For the chemist, the technical interest resides, in fact, in the greater or lesser rapidity and facility with which this modus operandi can be carried out.

The invention, forming the subject-matter of the present invention, is adapted to eliminate the above mentioned inconveniences by employing, for the colorimetric determination of the pH index, the colouring matters suitable for that purpose, in the form of a pencil lead. This new application involves quite new modus operandi. It is to be understood that the word "lead" does not designate an ordinary pencil lead, but a body similar, physically, to these pencil leads but having a special composition.

The paste serving for the formation of the "lead", is mainly constituted by the association of the above mentioned colouring matters in proportions variable according to the colouring capacity, from 0.25 to 5%, with a neutral carrier material, insoluble or difficultly soluble, not easily decomposable by acids or bases, and of suitable colour. Any white or coloured pigment satisfying these conditions is suitable, whether it is of a mineral nature, for example, sulphate of barium, of an organic nature, for example, starch, or of a complex mineral organic nature, for example, zinc stearate, these pigments being utilizable conjointly or separately. The use of a coloured carrier material is suitable either for modifying, or for intensifying a given point of the toning zone of the indicating colouring matter.

The association of the colouring matters with the carrier can be effected either by simple mixing, or also by dyeing, previous combination or lacquering, partially or in totality, of said carrier with said colouring matters.

Finally, the "lead" is made, and moulded according to known technical methods, and adapted to be used in a lead-holder or in the form of a pencil.

With the series of colouring matters usually employed for colorimetric determinations, the toning zones of which allow to scan all the range of the pH values, a series of reactive pencils is obtained, the set of which realizes the colorimetric determination of the pH index by carrying to the extreme the simplicity and rapidity of the operation.

In fact, it suffices, and this constitutes one of the remarkable features of this new method, to strictly adhere to the following modus operandi:

A drop of the solution to be examined is placed on a strip of filter paper for analysis, such as Durieux, Schleicher, etc., the strip itself being supported by a small glass plate or any other suitable support. A light stroke made with a reactive pencil on the portion thus impregnated instantaneously reveals, by the coloration of the line traced, the desired pH value, with respect to the range of specific toning of the pencil used. If necessary, the experiment may immediately be repeated by means of another pencil the toning zone of which is more approximate, the pH values obtained being confirmed one by the other according to the colouring matter chosen. By means of a few pencil strokes, the desired result is obtained in a few seconds.

Another feature of the present invention resides in the fact that the comparison scales, although easy to establish if need be in certain cases by starting from standard solutions of known pH values are here no longer indispensable for increasing the accuracy of the result, considering, on the one hand, the great variety of colouring matters, that is to say the great variety of toning zones which are conveniently available under such a reduced form and, on the other hand, owing to the great ease of manipulation of the pencil and to the great rapidity with which these toning zones can be compared.

Another remarkable advantage of the present invention resides in the possibility of determining the pH index without taking into account the natural coloration of the solutions. This advantage results from the fact that the observation of the indicating coloration takes place by reflection on the stroke traced by the pigment entering in the composition of the "lead", the tint being practically unaltered by the own coloration of the medium, as when observing by transparency in a tube through a certain thickness of liquid.

It is thus possible to appreciate, with a surprising facility, the pH value of a chromic liquor highly coloured in green, or that of a solution of molasses of brown colour.

Finally, the considerable practical importance of the present invention resides in the fact that the reactive pencil thus devised, and its instantaneous use, considerably increases the possibilities of application of the colorimetric method which then does not require the use of bottles of colouring matters, glassware, and fragile accessories. The reactive pencil is a useful instrument for the chemist, both in the laboratory and in the factory. On a woolen thread under treatment, on a small mass of paper pulp, placed on a hide operated upon, it suffices to make a stroke with the pencil for ascertaining at any moment the pH value, and this is indeed the original and entirely new characteristic feature of the present method.

What I claim as my invention and desire to secure by Letters Patent is:—

1. In a reactive pencil, a lead containing at least one colored indicator and chemically inactive carrier substance having a high reflecting power, the proportions of colored indicators being between about 0.25% and about 5% of the total composition of the lead, the remainder being substantially carrier substance, selected from a group consisting of sulphate of barium, starch and zinc stearate.

2. In a reactive pencil, the combination of a lead containing at least one colored indicator, with a chemically inactive carrier substance having a high reflecting power, said carrier substance being selected from a group consisting of sulfate of barium, starch and zinc stearate; the proportions of the constituents being such that during a stroke with said lead on an impregnated surface, the quality of high reflecting power comes into play.

RAYMOND ANTONIN ALBERT DRU.